Patented Aug. 12, 1952

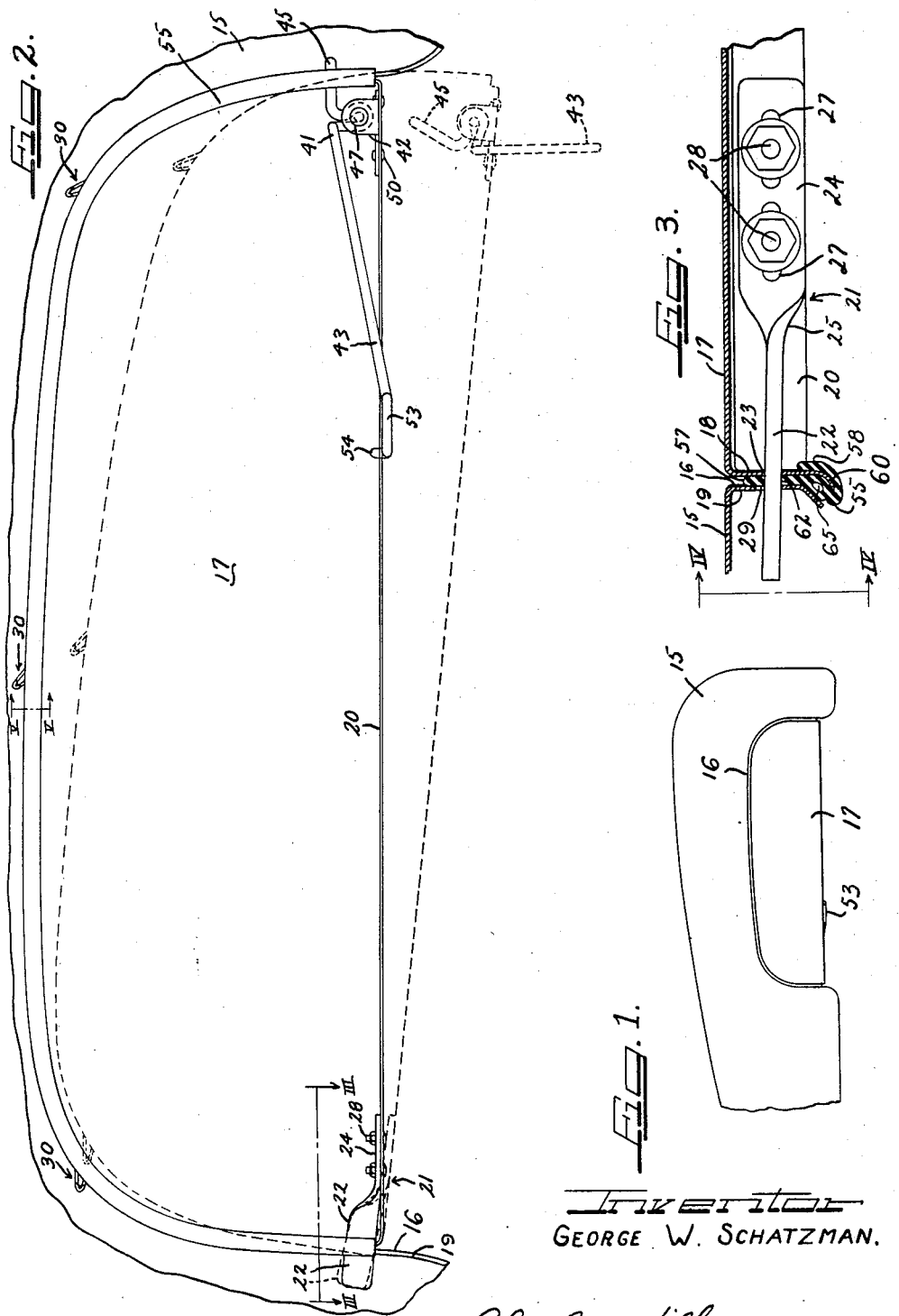

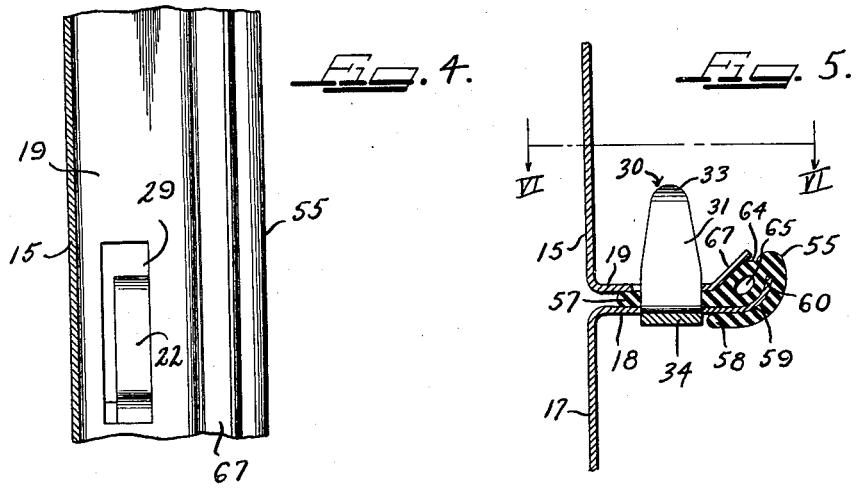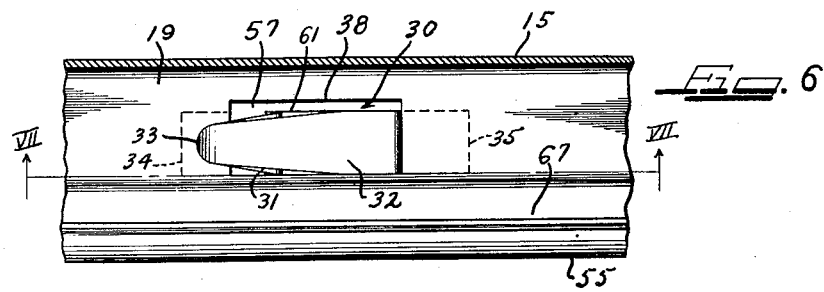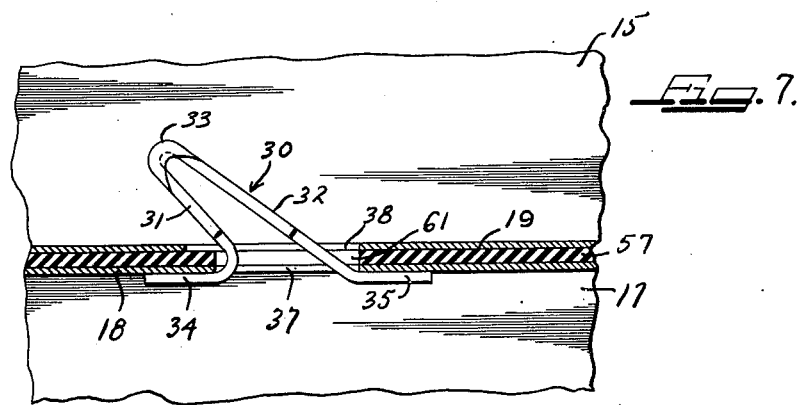

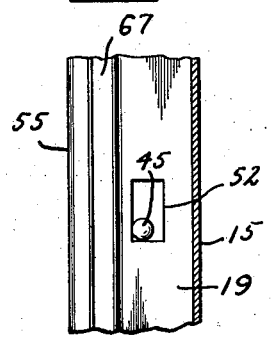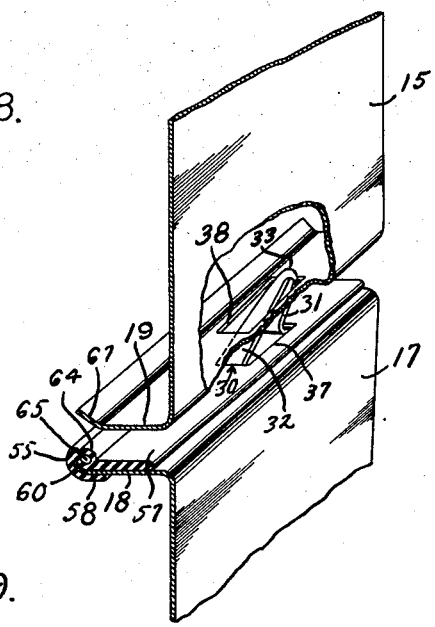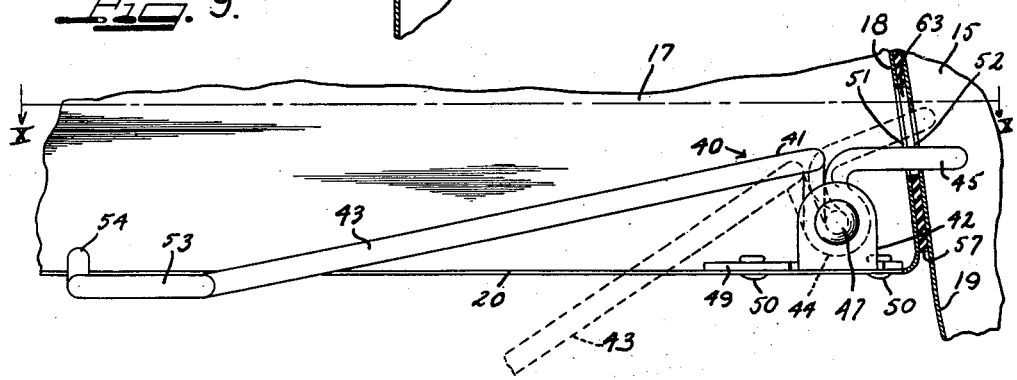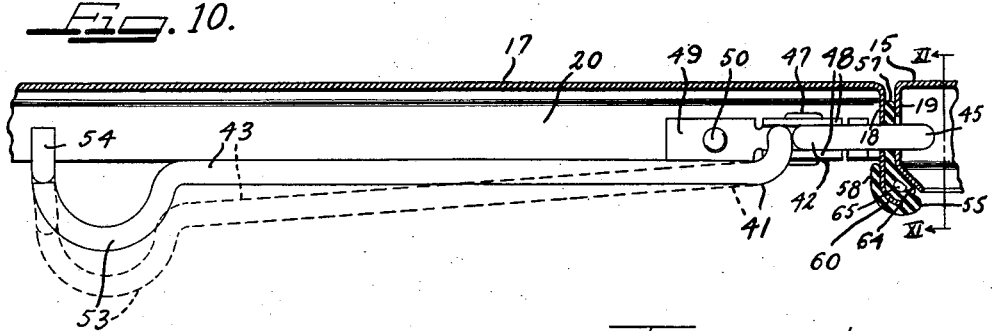
Inventor
GEORGE W. SCHATZMAN.

2,606,773

UNITED STATES PATENT OFFICE 2,606,773

FENDER AND FENDER SHIELD ASSEMBLY

George W. Schatzman, Detroit, Mich., assignor to Houdaille-Hershey Corporation, Detroit, Mich., a corporation of Michigan Application November 15, 1947, Serial No. 786,182

12 Claims. (Cl. 280—153)

This invention relates to improvements in fender and fender shield assemblies especially adaptable for use on automobiles.

In the vehicle industry, and particularly in the automobile branch thereof, various means have been utilized to improve the appearance of vehicle fenders. The usual vehicle fender is provided with an opening affording access to the vehicle wheel, and permitting ready removal or replacement of the wheel in an axial direction. Since this opening inherently presents an unattractive outward appearance, and in high speed operation an air turbulence factor, detachable fender shields have been employed to cover the opening protectively and ornamentally.

As the term "fender shield" shall hereinafter be employed, it refers to any member which is adapted to be secured to a fender or other portion of a vehicle body for the purpose of covering the opening in the fender or vehicle body which is provided for access to or removal of a vehicle wheel. Fender shields are also sometimes referred to as "fender skirts."

Furthermore, as the term "fender" shall hereinafter be employed, it refers to any form of wheel fender in its broad sense, whether such fender be separated from the vehicle body part, partly separated from the vehicle body part, or actually an integral part of the vehicle body and whether or not it projects outwardly from the principal body portion of the vehicle.

An important object of the present invention is to provide a novel fender and fender shield assembly in which the fender shield is removably attached to the fender in a novel manner.

Another object of the invention is to provide a fender shield having improved means for attaching the same to a fender.

A further object is to provide a novel structure for detachably securing a fender shield to a fender.

Still another object of the invention is to provide new and improved means whereby a fender shield is adapted to be mounted with ease and dispatch in a simple, easily understood and readily executed maneuver.

Yet another object of the invention is to provide improved means for effecting positive dislodgement of a fender shield from the fender with which associated should the fender shield become stuck in service and thus resist removal.

An additional object of the invention is to provide improved cushioning and anti-rattle means for a fender shield installation.

Other objects, features and advantages of the invention will be readily apparent from the following detailed description of a preferred embodiment thereof taken in conjunction with the accompanying three sheets of drawings, in which:

Figure 1 is a fragmentary side elevational view of a fender and fender shield assembly embodying the features of the present invention;

Figure 2 is an enlarged inside elevational view of the fender shield and contiguous portions of the associated fender;

Figure 3 is an enlarged fragmentary horizontal sectional view through one end of the fender and fender shield assembly taken substantially on the line III—III of Figure 2;

Figure 4 is a fragmentary vertical sectional elevational view taken substantially on the line IV—IV of Figure 3;

Figure 5 is an enlarged fragmentary vertical sectional detail view taken substantially in the plane of line V—V of Figure 2;

Figure 6 is a horizontal sectional plan view taken substantially on the line VI—VI of Figure 5;

Figure 7 is a vertical sectional elevational view taken substantially on the line VII—VII of Figure 6;

Figure 8 is a fragmentary perspective sectional view of a portion of the upper marginal structure of the fender shield and contiguous marginal portion of the fender showing the parts in partially assembled relationship;

Figure 9 is an enlarged fragmentary inside lower corner elevational view of the portion of the fender shield carrying the latching mechanism, and partially in section to show how the latching mechanism cooperates with the contiguous portion of the fender;

Figure 10 is a horizontal sectional plan view taken substantially on the line X—X of Figure 9; and Figure 11 is a fragmentary vertical sectional elevational view taken substantially on the line XI—XI of Figure 10.

A fender 15 having an access opening 16 carries removably attached thereto a fender skirt or shield 17 which protectively and ornamentally substantially closes the access opening (Figs. 1 and 2).

In the present instance, the fender shield 17 is arranged to lie flush with the outer surface of the fender shield 15 and is provided with an inturned preferably right angular reinforcing flange 18 encompassing at least the upper and end margins of the fender shield and opposed in assembly by a reinforcing marginal flange 19 on the fender defining the wheel access opening 16 (Figs. 3, 5 and 10). Both the fender 15 and the fender shield 17 are, as is usual practice, adapted to be made from suitable sheet metal, the fender shield comprising a panel which is maintained relatively rigid by the marginal flange 18 and also by a lower marginal flange 20 which may, if desired, be formed continuous with the flange 18.

According to the present invention, the fender 15 and the fender shield 17 are so constructed and arranged and equipped that in mounting the fender shield one end thereof is adapted to be attached as an initial step in the assembly whereafter the fender shield is pivoted or rocked upwardly in the plane of the fender side wall until substantially a fully assembled relationship is attained, and the fender shield then latched in place through the medium of latching mechanism at its opposite end. When in the assembled relationship, the fender shield is held positively against displacement from the fender and in cushioned, rattle-proof relation to the fender.

For effecting initial attachment of one end, preferably the front end of the fender shield 17 an attachment bracket assembly 21 (Figs. 2, 3 and 4) is provided. This includes a finger 22 which may be formed as a flat blade-like element projecting endwise through an appropriate vertical slot 23 in the contiguous portion of the marginal reinforcing flange 18 of the fender shield, the plane of the finger blade 22 being preferably vertical. At its inner end portion, the finger blade 22 is formed with a base flange 24 formed by twisting of the bar from which the finger is made at an intermediate point 25 to have the base flange 24 lie at right angles to the finger portion 22 and preferably flush with the lower edge of the finger. A pair of longitudinally elongated spaced slots 27 in the base flange 24 are adapted to receive the shanks of respective bolts 28 by which the base 24 is attached in longitudinally adjustable relation securely upon the upper face of the bottom flange 20 of the fender shield.

As best seen in Fig. 2, the attachment finger 22 extends substantially beyond the flange 18 and preferably angled diagonally upwardly for engagement within a retaining slot 29 appropriately located in the flange 19 of the fender. Since it is the lower edge of the slot 29 against which the finger 22 primarily engages, it will be clear that by adjusting the finger 22 longitudinally as permitted by the elongated base flange slots 27 effective assembly relationship of the fender shield to the upper portion of the flange 29 where it bounds the top of the access opening 16 can be readily accomplished. As best seen in Fig. 4, the slot 29 is of ample width and length to accommodate the attachment bracket finger 22 freely. Furthermore, the tip of the finger 22 is preferably rounded so as to facilitate entry into the slot 29. Thus, in the initial movement incident to applying the fender shield 17 to the fender 15, the attachment finger 22 is inserted into the slot 29 by an endwise movement of the fender shield into the position indicated in dash outline in Fig. 2.

In the second phase of applying the fender shield 17 to the fender 15 within the opening 16, the fender shield is rocked upwardly in its plane about the fulcrum provided by the lower edge of the slot 29 for the attachment finger 22. As an incident to such upward assembly rocking movement assembly retaining means at the top of the fender shield enters into engagement with the opening-bordering flange 19 of the fender. Herein such means comprises a series of generally hook-like fingers or prongs 30 (Figs. 2, 5, 6, 7 and 8).

Each of the finger or prong members 30 is adapted to be made from suitable sheet metal strip partially bent upon itself to provide a short forward leg 31 and a longer rear leg 32 joined at a rounded tip 33 and preferably converging toward the tip and also being tapered toward the tip. The legs 31 and 32 are tilted forwardly and are formed at their extremities with respective coplanar flanges 34 and 35 extending forwardly and rearwardly, respectively. The flanges are attached to the inner side of the marginal reinforcing flange 18 with the prong afforded by the legs 31 and 32 extending through an appropriate aperture 37 in the flange. As best seen in Fig. 7, the prong 30 projects over the flange 18 at the shorter leg side of the prong and the prong projects upwardly beyond the flange 18 a substantial distance.

As best seen in Fig. 2, there are preferably three of the prongs 30 provided on the upper edge of the fender shield 17, one of the prongs at the forward end of the fender shield projecting substantially longitudinally forwardly. Another of the prongs extends upwardly and is tilted forwardly at approximately the center of the top of the fender shield. The third of the prongs 30 extends upwardly and is tilted slightly forwardly at the rear end portion of the uppermost margin of the fender shield.

To receive each of the prongs 30, the marginal reinforcing flange 19 of the fender is provided at appropriate intervals with respective narrow apertures or slots 38 adapted in fully assembled relation to substantially register with the slots 37 in the fender shield flange 18 and being preferably slightly longer, but shorter than the full forward projection of the respective prongs 30. Thereby, the prongs 30 cannot be projected into their respective fender flange slots 38 by straight upward movement of the fender shield, but the fender shield must first be assembled at its forward end by means of the attachment finger 22 and then rocked into final assembly whereby the attachment prongs 30 rock freely into the respective slots 38. The slots 38 are of course of ample width to accommodate the prongs 30 freely, and the sides of the slots 38 cooperate with the prongs 30 to retain the fender shield against transverse displacement relative to the fender.

After the fender shield has been rocked substantially to its final assembled relation to the fender, latching mechanism 40 at the lower rear end of the fender shield 17 is brought into play to effect final attachment of the fender shield to the fender.

In a practical arrangement, the latching mechanism 40 comprises a latching lever 41 supported pivotally by a bracket 42 mounted upon the fender shield lower marginal flange 20.

As best seen in Figs. 2, 9 and 10, the latch lever 41 comprises a relatively elongated handle portion 43 formed with an integral bent loop 44 adjacent its rear end and terminating in a latching finger 45 which is preferably rounded off at its tip. The loop 44 provides a hinge eye through which extends a pivot pin 47 connected between upstanding spaced parallel ears 48 on the bracket 42 by which the lever is pivotally supported for pivotal movement parallel to the general plane of the fender shield 17. The bracket 42 has a base flange portion 49 by which it is mounted upon the flange 20 of the fender shield and secured thereto as by means of rivets 50.

The handle portion 43 of the latching lever is preferably inwardly offset relative to the head end or latching finger portion of the lever so as to clear the inner edge of the flange 20 for swinging of the lever about the pivot 47 by downward movement of the handle portion 43 substantially as indicated in broken outline in Fig. 2.

In the generally vertical condition of the latching lever 41, wherein the handle portion 43 thereof is swung down, the latching finger 45 is cleared from its latching position and remains inactive while the fender shield is being initially manipulated into position with respect to the fender. In its latching position, the latching finger 45 extends generally horizontally and projects through a horizontal slot 51 in the adjacent portion of the fender shield flange 18 and sufficiently beyond such flange to enter into latching engagement with the fender flange 19, projecting through a vertical slot 52 provided for this purpose in the fender flange. The slot 51 in the fender shield flange is, of course, of ample length to accommodate the swinging movement of the latching finger 45 as the latching lever is swung from and between active and inactive positions. The lower edge of the fender flange slot 52 is disposed at such an elevation that when the latching lever is in its fully operative position, the latching finger 45 engages the same with ample downward pressure to force the fender shield 17 adequately upwardly in its plane for effective assembled relationship to the fender.

The latched condition of the lever 40 is maintained through the medium of an interlock relationship afforded between the forward extremity of the lever handle 43 and the fender shield flange 20. To this end, the forward extremity of the lever handle is formed with an inwardly and then outwardly turned loop 53 which has a latching terminal 54 adapted to engage latchingly upon the flange 20 substantially as shown in the full line position in Figs. 9 and 10. The latching terminal 54 extends outwardly beyond the general axis of the handle portion 43, and the handle portion 43 is of ample length and inherent resilience so that when releasing or when engaging the latching terminal 54 with the flange 20, the handle portion 43 is adapted to be flexed inwardly substantially in the manner indicated in dash outline in Fig. 10. For effecting this resilient deflection of the handle portion 43, the loop 53 affords a convenient finger grip which, by extending inwardly is readily accessible from the front of the fender shield by reaching up under and behind the fender shield.

Since in service the fender shield is, of course, subject to splash from the adjacent wheel of the vehicle, there may be a tendency for the same to stick and thereby resist removal. However, such resistance is arranged to be overcome by action of the latching finger 45. This is accomplished by having the upper end of the engagement slot 52 in the fender flange 19 slightly shorter than necessary to clear the latching finger 45 when it is swung from the latching position with the lower edge of the slot 52 as a preliminary to release and removal of the fender shield. This relationship is schematically indicated in dash outline in Fig. 9. Hence, should the fender shield be stuck in place, downward leverage of the latch handle 43 will cause the latching finger 45 to engage the upper edge defining the slot 52 and exert leverage thereon by pushing upwardly thereagainst and consequently forcing the adjacent end of the fender shield downwardly away from the fender. In order to have the advantage of this relationship, it is necessary in the assembly of the fender shield with the fender to manipulate the latching lever 41 appropriately by swinging the handle 43 upwardly at the time the fender shield is swung up into its final position so as to accommodate the latching finger 45 for entry into the retaining slot 52.

A rattle-proof, tensioned juncture of the fender shield 17 with the fender 15 is assured by a resilient gasket 55 which is interposed between the flange 18 of the fender shield and the opposing flange 19 of the fender. As best seen in Figs. 3, 5, 8 and 10, the gasket 55 is in the form of a molding which may conveniently be made from resilient rubber or its equivalent, the term "rubber" being used in the generic sense to cover any equivalent material. The gasket molding 55 is formed to be self-retaining upon the fender shield flange 18. To this end, it is formed with a gasket flange 57 which is arranged to lie contiguous the outer surface of the fender shield flange 18 and provides a gasket of cushioning material between the fender shield flange 18 and the fender flange 19 in the assembled relation of the fender shield within the access opening 16. Integral in one piece with the gasket flange 57, is a retaining flange 58 which is reversely directed from the margin of the gasket member 55 which is located at the inner extremity of the fender shield flange 18. In this manner the flanges 57 and 58 of the gasket member are adapted to coact for clampingly receiving the fender shield flange 18, and more particularly the inner margin of such flange therebetween, the opposing faces of the flanges 57 and 58 affording a socket 59 closely grippingly fitting and receiving the inner margin of the flange 18. Additional security of retention of the gasket molding is assured by having the inner margin of the flange 18 formed with a laterally turned marginal extremity portion 60, herein extending generally toward the opposing portion of the fender, namely the fender flange 19 and away from the general fender shield confines defined by the flange 18. Thereby an interhooked relationship is effected between the flange 18 and the gasket molding 55. Further assurance of retention of the gasket molding 55 on the flange 18 is afforded by the fender shield retaining prongs 30 which extend through the gasket flange 57 as best seen in Figs. 5 and 7 where the prongs extend through the fender shield flange 18, the gasket flange having appropriate respective openings 61 registering with the prong openings 37 in the fender shield flange. In addition, at the respective ends of the fender shield the retaining finger 22 extends through the gasket flange 57 by way of an opening 62 which registers with the opening 23 in the fender shield flange 18; and the latching finger 45 extends through the gasket flange 57 by way of an opening 63 therein which registers with the latching finger opening 51 in the fender shield flange.

In order to assure a tensioned, thoroughly rattleproof relationship, the gasket molding 55 is formed with an integral longitudinal cushioning bead or rib 64 within the marginal reentrant corner defined by conformity of the gasket flange portion 57 of the gasket molding with the interhooking turned flange portion 60 of the fender shield flange. The rib 64 is preferably hollow to provide a longitudinal compressible air space 65 so that in assembly with the fender a diagonal presser foot marginal terminal portion 67 on the fender flange 19 will engage against and compressingly bear upon the rib 64. This has not only the effect of cushioning the opposed fender shield and fender flanges 18 and 19, respectively, but also effects an inward force or yielding pressure uniformly around the fender shield top and end portions whereby to drive the prongs 30, the end retaining finger 22 and the latching finger 45 against the inner edges of the respective openings within which they engage in the fender flange 19. As shown in Fig. 4, this causes the retaining finger 22 to hug the lower inside corner of the engagement slot 29. Similarly, this action causes the latching finger 45 to hug the lower inside corner of the engagement slot 52 (Fig. 11). At the same time the resilient pressure of the compressed rib 64 causes the prongs 30 to engage against the inner edge of the respective openings 38 in the flange 19, as best seen in Figs. 5 and 6. Adequate compressive force between the flanges 18 and 19 is, of course, maintained in the assembled relationship of the fender shield 17 with the fender 15 by the upward force exerted through proper adjustment of the attaching finger 22 and the downward pressure of the finger 45 against the lower engaged edge defining the slot 52, thereby pushing the fender shield upwardly in its plane.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in a fender and fender shield assembly, the fender having a wheel access opening defined by an inwardly extending flange and the fender shield being adapted to close said opening and having an inwardly extending flange opposing the fender flange, a preliminary attaching finger projecting from one end of the fender shield through the flange thereon, the fender flange having an engagement opening into which the finger projects and providing a fulcrum about which the fender shield is adapted to be swung up into engagement within the access opening supported by said finger, said fender flange having a plurality of spaced apertures at the top of the access opening, a plurality of angular prongs carried by the fender shield and engageable retainingly in the respective apertures as an incident to rocking of the fender shield into assembled position, and a latch member having a latching finger swingable into latching engagement after the fender shield has been swung into assembly, said fender flange having an aperture therein having a lower edge engageable by said latching finger and against which the latching finger presses downwardly to force the fender shield upwardly, said aperture within which the latching finger engages having the upper edge thereof disposed to interfere with the free swinging of the latching finger out of engagement where the fender shield resists downward displacement as an incident to removal thereof, whereby the latching finger is capable of providing a downwardly displacing thrust to the fender shield.

2. In combination in a fender and fender shield assembly, a fender having a wheel access opening defined by an inwardly extending marginal flange, a fender shield having a generally complementary flange in assembly opposingly related to the fender flange, a retaining finger extending endwise from the fender shield through the fender shield flange and having a lower longitudinal surface, and said fender flange having an aperture therein within which the finger is engageable for retaining the fender shield in place, said aperture having a lower edge engaged by the lower longitudinal surface of the finger, said finger being mounted on the fender shield for longitudinal adjustment and having said lower longitudinal surface extending diagonally upwardly whereby longitudinal adjustment thereof with the finger determines the relative vertical assembled relationship of the end portion of the fender shield with which the finger is associated and the fender flange, whereby adjustment can be effected in the fit of the fender shield vertically within the wheel access opening.

3. In combination in a fender and fender shield assembly, a fender having a wheel access opening defined by an inwardly extending marginal flange, a fender shield having a generally complementary flange in assembly opposingly related to the fender flange, a retaining finger extending endwise from the fender shield through the fender shield flange, and said fender flange having an aperture therein within which the finger is engageable for retaining the fender shield in place, said finger comprising a flat metal bar intermediately twisted to afford a flat finger portion having its major plane extending vertically and an attachment portion with its major plane horizontal, the fender shield having a lower flange to which said attachment portion is secured.

4. In a fender shield assembly, a fender shield panel, said panel having a lower horizontal marginal flange, an attachment finger member comprising a finger portion extending diagonally upwardly beyond one end of the fender shield and having a base portion resting on said flange, and means securing the base portion to said flange and adapted to permit longitudinal adjustment of the finger member.

5. In combination in a fender and fender shield assembly, a fender having an access opening defined by an inwardly extending flange, a fender shield including an inwardly extending flange generally complementary to and opposing the fender flange, and a latching member carried by one end of the fender shield and having a pivotal connection therewith, the latching member comprising an elongated handle portion and a shorter latching finger portion swingable about a horizontal axis to extend from an inactive position within the confines of said fender shield flange to an active position projecting beyond said fender shield flange, the fender shield flange having a clearance opening therethrough for the latching finger, the fender flange having an opening therein receptive of the latching finger and including a lower edge engageable by the latching finger in the full active position thereof and so disposed that in the latching position the latching member imparts a downward thrust on said edge and a reverse upward thrust upon the associated end portion of the fender shield.

6. In combination in a fender and fender shield assembly, a fender having an access opening defined by an inwardly extending flange, a fender shield including an inwardly extending flange generally complementary to and opposing the fender flange, and a latching member carried by one end of the fender shield and having a pivotal connection therewith, the latching member comprising an elongated handle portion and a shorter latching finger portion swingable about a horizontal axis to extend from an inactive position within the confines of said fender shield flange to an active position projecting beyond said fender shield flange, the fender shield flange having a clearance opening therethrough for the latching finger, the fender flange having an opening therein receptive of the latching finger and including a lower edge engageable by the latching finger in the full active position thereof and so disposed that in the latching position the latching member imparts a downward thrust on said edge and a reverse upward thrust upon the associated end portion of the fender shield, said latching member comprising a one-piece rod structure having an intermediate loop portion affording a pivot bearing.

7. In combination in a fender and fender shield assembly, a fender having an access opening defined by an inwardly extending flange, a fender shield including an inwardly extending flange generally complementary to and opposing the fender flange, and a latching member carried by one end of the fender shield and having a pivotal connection therewith, the latching member comprising an elongated handle portion and a shorter latching finger portion swingable about a horizontal axis to extend from an inactive position within the confines of said fender shield flange to an active position projecting beyond said fender shield flange, the fender shield flange having a clearance opening therethrough for the latching finger, the fender flange having an opening therein receptive of the latching finger and including a lower edge engageable by the latching finger in the full active position thereof and so disposed that in the latching position the latching member imparts a downward thrust on said edge and a reverse upward thrust upon the associated end portion of the fender shield, said finger aperture in the fender flange having an upper edge disposed to interfere with free swinging of the latching finger out of latching position in the absence of downward movement of the fender shield out of assembled position with the fender and thereby affording a dislodging thrust fulcrum for the finger.

8. In a fender and fender shield assembly, a fender having a wheel access opening defined by an inwardly extending flange including, in cross-section, a generally horizontal portion joining the fender proper and an inner terminal portion angled upwardly from the horizontal portion, a fender shield having an inwardly extending marginal flange including a generally horizontal portion complementary to and arranged to oppose the horizontal portion of the fender flange, said fender shield flange also having an upturned inner terminal portion joining the horizontal portion of the fender shield flange, means for connecting the fender shield to the fender, and a cushioning gasket carried by said fender shield flange and comprising a pair of elongated legs of substantial width joined marginally and defining a reentrant socket therebetween within which said upturned terminal portion of the fender shield flange is engaged interlockingly, the upper leg of the gasket overlying the horizontal portion of the fender shield flange and being compressed thereby against the horizontal portion of the fender flange, said upper leg adjacent to the juncture thereof with the remaining leg of the gasket having a longitudinal rib projecting toward and being pressed against said upwardly angled terminal portion of the fender flange.

9. In a fender shield structure, a fender shield panel having a marginal flange thereon extending inwardly therefrom and having an inner marginal terminal portion thereof turned generally upwardly, and a cushioning gasket of resilient material carried by said flange and including an upper leg portion lying upon the upper side of said flange and a lower leg portion engaging under the flange, said leg portions being joined together and turned upwardly at their juncture and defining therebetween a socket inter-hooked with said turned-up portion of the fender shield flange, said upper leg of the gasket having a generally reentrant corner formation adjacent to said juncture and having outwardly from said turned-up fender shield flange portion and within said reentrant corner a generally upwardly and outwardly projecting rib extending substantially from the general plane of the upper surface of said upper leg for pressure engagement with a portion of a fender flange with which the fender shield may be assembled.

10. In combination in a fender and fender shield assembly, a fender having a wheel access opening, a fender shield for closing said opening, an elongated attachment finger extending endwise from one end portion of the fender shield and having a base portion, means attaching said base portion to the fender shield for relative longitudinal adjustment, the portion of said finger which projects beyond the end of the fender shield having a lower surface extending angularly upwardly from the fender shield, and means on the fender providing a fixed surface against which said angular lower surface of the finger engages for supporting the fender shield in a predetermined vertical relationship relative to the fender, longitudinal adjustment of the finger predetermining which portion of said upwardly angled lower surface will engage said fixed surface so that by longitudinal adjustment of the finger vertical adjustment of the fender shield relative to the fender is effected.

11. In combination in a fender and fender shield assembly, a fender having a wheel access opening defined by an inturned flange, a fender shield for closing said wheel access opening, one end portion of the fender shield and the adjacent portion of the fender at the wheel access opening having means for inter-engagement to support said one end of the fender shield in position on the fender rockably in a vertical direction into and out of closing relation to the wheel access opening, a plurality of attachment fingers extending beyond the upper edge of the fender shield from respective spaced points, each of said fingers being angled generally toward said one end of the fender shield, said fender flange having respective apertures therein into which said fingers extend in the fully assembled relationship of the fender shield with the fender, the portions of the fender flange defining those ends of the respective apertures which are disposed nearest said one end of the fender shield underlying the portions of the fingers which project through said apertures in the fully assembled relationship, said fingers being arranged to clear said flange portions in the assembly and disassembly of the fender shield as an incident to said vertical rocking of the fender shield, and means at the remaining end of the fender shield and the adjacent portion of the fender at the wheel access opening for latching the fender shield in the fully assembled relation to the fender.

12. In combination in a fender and fender shield assembly, a fender having a wheel access opening defined by an inturned flange, a fender shield for closing said wheel access opening, one end portion of the fender shield and the adjacent portion of the fender at the wheel access opening having means for inter-engagement to support said one end of the fender shield in position on the fender rockably in a vertical direction into and out of closing relation to the wheel access opening, an attachment finger extending beyond the upper edge of the fender shield, said finger being angled generally toward said one end of the fender shield, said fender flange having an aperture therein into which said finger extends in the fully assembled relationship of the fender shield with the fender, the portion of the fender flange defining the end of the aperture which is disposed nearest said one end of the fender shield underlying the portion of the finger which projects through said aperture in the fully assembled relationship, said finger being arranged to clear said flange portion in the assembly and disassembly of the fender shield as an incident to said vertical rocking of the fender shield, and means at the remaining end of the fender shield and the adjacent portion of the fender at the wheel access opening for latching the fender shield in the fully assembled relation to the fender.

GEORGE W. SCHATZMAN.

REFERENCES CITED

The following references are of record in the file of this patent:

UNITED STATES PATENTS

| Number | Name | Date |
|---|---|---|
| 2,017,564 | Claud-Mantle | Oct. 15, 1935 |
| 2,048,862 | Haltenberger | July 28, 1936 |
| 2,062,597 | Moore | Dec. 1, 1936 |
| 2,068,732 | Cadwallader | Jan. 26, 1937 |
| 2,222,619 | Jandus | Nov. 26, 1940 |
| 2,273,523 | Jandus | Feb. 17, 1942 |
| 2,287,615 | Jandus | June 23, 1942 |
| 2,312,536 | Fergueson | Mar. 2, 1943 |
| 2,369,035 | Fergueson | Feb. 6, 1945 |